United States Patent [19]

Sakakibara et al.

[11] Patent Number: 5,463,773

[45] Date of Patent: Oct. 31, 1995

[54] BUILDING OF A DOCUMENT CLASSIFICATION TREE BY RECURSIVE OPTIMIZATION OF KEYWORD SELECTION FUNCTION

[75] Inventors: Yasubumi Sakakibara; Kazuo Misue, both of Kawasaki, Japan

[73] Assignee: Fujitsu Limited, Kawasaki, Japan

[21] Appl. No.: 66,218

[22] Filed: May 25, 1993

[30] Foreign Application Priority Data

May 25, 1992 [JP] Japan .................................. 4-131211

[51] Int. Cl.⁶ ..................................................... G06F 17/30
[52] U.S. Cl. ........................... 395/600; 395/427; 382/226; 364/419.08; 364/225.4; 364/282.3; 364/974; 364/225.3; 364/DIG. 1; 364/DIG. 2
[58] Field of Search ..................... 395/600, 425; 364/419.08; 382/37, 38, 10

[56] References Cited

U.S. PATENT DOCUMENTS

| | | | |
|---|---|---|---|
| 4,318,184 | 3/1982 | Millett et al. | 395/600 |
| 4,606,002 | 8/1986 | Waisman et al. | 395/600 |
| 4,817,036 | 3/1989 | Millett et al. | 395/600 |
| 5,168,565 | 12/1992 | Tetsugamorita | 395/600 |
| 5,265,065 | 11/1993 | Turtle | 395/600 |
| 5,325,465 | 6/1994 | Hung et al. | 395/63 |

OTHER PUBLICATIONS

Moura-Pires, "A Decision Tree Algorithm With Segmentation", *Proceedings IECON 91. 1991 International Conference on Industrial Electronics, Control, and Instrumentation*, vol. 3, 28 Oct.–1 Nov., 1991, pp. 2077–2082.

J. R. Quinlan, "Induction of Decision Trees," (Abstract) *Machine Learning* 1:81–106, 1986, © 1986 Kluwer Academic Publishers, Boston–Manufactured in The Netherlands. Abstract only.

Sakakibara et al., "A Noise Model on Learning Sets of Strings," (Abstract) COLT'92, 7/92/PA, USA© 1992 ACM 0-89791-498-8/92/0007/0295, p. 295. Abstract only.

*Primary Examiner*—Thomas G. Black
*Assistant Examiner*—Paul R. Lintz
*Attorney, Agent, or Firm*—Staas & Halsey

[57] ABSTRACT

A document classifying system is formed by a document data classifying system, a document classifying function building system, a sample data storage apparatus and a keyword storage apparatus. The document data classifying system inputs document data and defines a classification to which the document data belongs. The document classifying function building system is operatively connected to the document data classifying system and automatically builds a classification decision tree in the document data classifying system. A sample data storage apparatus is operatively connected to the document classifying function building system and stores sample data formed by a set comprised of the document data and the classification to which the document data belongs. The keyword storage apparatus is operatively connected to the document classifying function building system and stores keywords extracted thereby.

6 Claims, 9 Drawing Sheets

Fig. 3

| | |
|---|---|
| 00 | MEDICAL DICTIONARY |
| 00 | CHEMICAL DICTIONARY |
| 00 | IMAGE ANALYSIS HANDBOOK |
| 00 | INFORMATION SCIENCE DICTIONARY |
| 00 | MATHEMATICS SCIENCE DICTIONARY |
| 00 | INFORMATION PROCESSING HANDBOOK |
| 00 | ARTIFICIAL INTELLIGENCE DICTIONARY |
| 00 | WORLD MAP |
| 00 | BIOCHEMICAL DICTIONARY |
| 00 | LABORATORY LIST VOL 2 |
| 00 | LABORATORY LIST VOL 1 |
| 00 | CREATIVE DEVELOPMENT HANDBOOK |
| 00 | SALS GUIDE |
| 01 | CURVE AND GRAPH |
| 01 | ELEMENTARY MATHEMATICS |
| 01 | MATHEMATICAL FORMULA AND ITS APPLICATION |
| 01 | CONTROL INFORMATION VOL 1 |
| 01 | ALGEBRA AND GEOMETRY GUIDE |
| 01 | RESEARCH OF DIFFERENTIAL EQUATION |
| 02 | PROCEEDINGS IN SYMPOSIUM 1991 |
| 02 | GNU Emacs MANUAL |
| 02 | Hyper Talk 2.0 COOK BOOK |
| 02 | OPEN LOOK STYLE BOOK |
| 02 | OPEN LOOK FUNCTIONAL SPEC |
| 02 | SUN SYSTEM MANAGEMENT |
| 02 | Tex BOOK |
| 02 | IMAGE AND LANGAGE ENGINEERING |
| 02 | INFORMATION SYMPOSIUM No.39 PROCEEDINGS VOL 1 |
| 02 | INFORMATION SYMPOSIUM No.39 PROCEEDINGS VOL 2 |

Fig. 4

| CLASSIFICATION | ITEM | CONTENTS |
|---|---|---|
| 0 0 | REFERENCE | HANDBOOK, DICTIONARY, etc. |
| 0 1 | MATHEMATICS | ALGEBRA, PROBABILITY, etc. |
| 0 2 | INFORMATION SCIENCE | INFORMATION SCIENCE, COMPUTER SCIENCE, etc. |
| 0 3 | LANGAGE SCIENCE | LINGUISTICS, SYNTAX, etc. |
| 0 4 | SYSTEM SCIENCE | SYSTEM THEORY, CONTROL THEORY, ROBOTICS, etc. |
| 0 5 | BIOLOGICAL SCIENCE | BIOTECHNOLOGY, DNA THEORY, NEURAL SCIENCE, etc. |
| 0 6 | CULTURE SCIENCE | PHILOSOPHY, PSYCHOLOGY, etc. |
| 0 7 | SOCIAL SCIENCE | SOCIAL SCIENCE, POLITICS, MANAGEMENT, etc. |
| 0 8 | ENVIRONMENTAL SCIENCE | ENVIRONMENTAL SCIENCE, etc. |
| 0 9 | EDUCATION | PEDAGORY, LIBRARY SCIENCE, etc. |
| 1 0 | ENGINEERING | ELECTRICAL/MECHANICAL ENGINEERING, etc. |
| 1 1 | PHYSICS | PHYSICAL SCIENCE |

Fig. 5

```
ALGORITHM LEARN

Input:
    · A sample S, ———(1)
    · Parameters key11, key12, prnrt, and nsrt. ———(2)

Output:
    A decision tree T.

Procedure:
    1. Calculate the following:
                                                                        ⎤
        Keywords = {v | key11 ≤ | v | ≤key12,                           ⎥———(3)
                    v is a substring of w for some example (w, l) };    ⎦
                                                           ———(4)
    2. Let T = FINDS (S, Keywords, prnrt, nsrt);
    3. Output T and halt.———(5)
```

Fig. 6

Subprocedure FINDS (S, Keywords, prnrt, nsrt):

1. If $(|S| - \text{Occur}(S, l_i))/|S| \leq \text{nsrt}$ for some $l_i$, ────(6)
   stop and return the decision tree $T = l_i$;

2. If $|S| \leq \text{prnrt}$, ────(7)
   stop and return the decision tree $T = l_i$ for a largest $\text{Occur}(S, l_i)$;

3. Else 3.1. Calculate $\text{Loss}(v, S)$ for all $v \in \text{Keywords}$ that is informative for $S$;

3.2. If there is no informative keyword in Keywords,
        then stop and return $T = \text{"bad"}$;

3.3. Choose a longest keyword $v_g$ that minimizes $\text{Loss}(v_g, S)$;

3.4. Let $T_0 = \text{FINDS}(S_0^{v_g}, \text{Keywords} - \{v_g\}, \text{prnrt}, \text{nsrt})$
        and $T_1 = \text{FINDS}(S_1^{v_g}, \text{Keywords} - \{v_g\}, \text{prnrt}, \text{nsrt})$;

3.5. Stop and return the decision tree with root labelled $v_g$, left subtree $T_0$ and right subtree $T_1$;

Fig. 7

SYSTEM' S

SYSTEM' S DESIGN

SYSTEM' S DESIGN, RESEARCH

SYSTEM' S DESIGN, RESEARCH AND

SYSTEM' S DESIGN, RESEARCH AND DEVELOPMENT SYSTEM

SYSTEM SYMPOSIUM

SYSTEM SYMPOSIUM PROCEEDINGS

SYSTEM SYMPOSIUM PROCEEDINGS AND

SYSTEM SYMPOSIUM PROCEEDINGS AND MATRIAL PROGRAMMING

PROGRAMMING MANUAL

PROGRAMMING MANUAL AND

PROGRAMMING MANUAL AND HANDBOOK

Fig. 9

```
02  PROCEEDINGS FOR LARGE SCALE PATTERN INFORMATION
04  PROCEEDINGS FOR SYSTEM SYMPOSIUM No. 14
04  PROCEEDINGS FOR SYSTEM CONTROL SYMPOSIUM No. 33
04  PROCEEDINGS FOR SYSTEM CONTROL SYMPOSIUM No. 35
04  PROCEEDINGS FOR DISCRETE EVENT SYSTEM SYMPOSIUM No. 3
04  PROCEEDINGS FOR DISCRETE EVENT SYSTEM SYMPOSIUM No. 4
04  PROCEEDINGS FOR DISCRETE EVENT SYSTEM SYMPOSIUM No. 6
04  PROCEEDINGS FOR DISCRETE EVENT SYSTEM SYMPOSIUM No. 7
10  PROCEEDINGS FOR ROBOTICS SYSTEM SYMPOSIUM No. 3
```

BUILDING OF A DOCUMENT CLASSIFICATION TREE BY RECURSIVE OPTIMIZATION OF KEYWORD SELECTION FUNCTION

BACKGROUND OF THE INVENTION

1. Field of the Invention

The present invention relates to a document classifying system consisting of a document data classifying system and a document classifying function building system. The document data classifying system has a retrieval means and a classification decision tree. The document classifying function building system has an extraction means, a setting means, an allocation means, etc., and generates keywords, classifications, etc., to the document data classifying system to determine the classification decision tree.

The document data classifying system according to the present invention can easily define the classification to which document data belongs when it is input. Further, the document classifying function building system according to the present invention is provided for automatically building the classification decision tree of the document data classifying system.

2. Description of the Related Art

Recently, document-type database and full-text type databases are widely utilized in various fields so that a large amount of document data or text data is electronically stored in these databases. Accordingly, users have desired development of a high speed retrieval system for accessing these databases. In the development of a high speed retrieval system, there are two major problems to be solved, i.e., how to extract keywords used for the classification of the document data and how to automatically classify the document data by using the extracted keywords.

Conventionally, various documents have disclosed methods of automatic extraction of keywords and methods of automatic classifying of document data, both by using a computer. For example, as a first document, Sugiyama et al., "An Automatical Extraction System for Index Words and its Analysis", a report given at the Information Processing Symposium, Dec. 2, 1989; and as a second document, Uchiyama, et al., "An Extraction Method for Important Keywords", a report given at Information Processing Data Base Symposium, Aug. 4, 1991, can be mentioned.

However, there are common problems in these two documents, in that both of these approaches depend on a so-called "language processing technique", for example, a processing technique for the Japanese language. For example, a dictionary and a thesaurus, both necessitated in the processing technique, must be built to be dependent on a human interaction. That is, the dictionary and thesaurus are manually operated to prepare the document data, and keywords are determined from the document data by sequentially describing the document data. In this case, the document data are separated into several word sequences (so-called, "separated description" of word sequences) to determine keywords. As an example of the separated description, there are "system", "system's design", "system's design and research", and "system's design, research, and development", etc. These word sequences are sequentially retrieved to determine the keyword.

Further, as an another method for determining the keyword in a conventional art, some words having a higher frequency of appearance are extracted to determine the keyword from the word sequence. Further, as still another method, unnecessary words which are not suitable as keywords (these keywords are determined by a user) are eliminated, and the remaining words are extracted as the keyword.

However, there are some problems in the former method using "appearance frequency". That is, words which are unsuitable as keywords, for example, the words "problem" and "influence", may be extracted from consideration as a keyword if these words have a high appearance frequency. On the contrary, in this method, important words that are suitable as a keyword, but have a low appearance frequency, may not be extracted as the keyword.

Further, there are some problems in the latter method using "elimination of unnecessary words". That is, in this method, since many words are simply separated without any consideration of the contents of the document data, a large amount of words are extracted as keywords.

As is obvious from the above explanations, in a conventional art, no document data classifying system has been disclosed for defining the classification of a document data and document classifying function building system for supporting the document data classifying system.

Accordingly, to solve the above problems, in the present invention, a document classifying system includes a document data classifying system and a document classifying function building system. The document data classifying system includes a retrieval means and a classification decision tree. The document classifying function building system includes an extraction means, a setting means, an allocation means, etc., and generates keywords, classifications, etc., to the document data classifying system to determine the classification decision tree in the document data classifying system.

The document data classifying system according to the present invention can easily define the classification to which document data belongs when it is input. Further, the document classifying function building system according to the present invention is provided for automatically building the classification decision tree of the document data classifying system.

SUMMARY OF THE INVENTION

The object of the present invention is to provide a document classifying system which can easily defines a classification to which an input document data belongs and can automatically build a classification decision tree for the document data.

In accordance with the present invention, there is provided a document classifying system including: a document data classifying system for inputting document data and defining a classification to which the document data belongs; a document classifying function building system operatively connected to the document data classifying system for automatically building a classification decision tree in the document data classifying system; a sample data storage apparatus operatively connected to the document classifying function building system for storing sample data formed by a set of the document data and the classification to which the document data belongs; and a keyword storage apparatus operatively connected to the document classifying function building system for storing keywords extracted thereby.

In one preferred embodiment, the document data classifying system comprises: a retrieval unit for inputting a document data, retrieving the document data, and outputting a classification of the document data as a result of the retrieval; and a classification decision tree structure operatively connected to the retrieval unit and having a plurality of nodes and classifications connected to each other so as to form the tree-structure in which each node is allocated by a keyword and a branched destination of a node having a keyword is different from a branched destination not having a keyword, and for defining the classification to which the document data belongs by retrieving the tree-structure.

In another embodiment, the document classifying function building system comprises:

- an extraction unit operatively connected to the sample data storage apparatus and the keyword storage apparatus for referencing the sample data consisting of the set of the document data and the classification to which the document data belongs and extracting keywords defined by a connection of a word sequence from the sample data;
- a calculation unit for calculating an evaluation value included in a designated keyword in accordance with an evaluation function for calculating the evaluation value defined by one attribute value for the document data including the designated keyword within an object document data and another attribute value for the document data not including the designated keyword within the object document data;
- a setting unit operatively connected to the calculation unit for determining the document data defined by the sample data for a root node, and, except for the root node, defined by the document data separated until it reaches an upper node and is classified by keywords allocated by the upper node;
- a decision unit operatively connected to the setting unit for determining whether or not the attribute included in the object document data is sufficient to satisfy a predetermined completion conditions when the setting unit determines the object document data; and
- an allocation unit operatively connected to the calculation unit, the setting unit and the decision unit, for, on the other hand, sequentially designating non-allocated keywords and calling the calculation unit when the decision unit does not determine satisfaction of the completion conditions, obtaining the evaluation value included in each non-allocated keyword, allocating one of the non-allocated keywords to the node in accordance with the evaluation value; and on the other hand, when the decision unit determines that the completion conditions is satisfied, allocating the classification indicated by the object document data to the node instead of keywords, wherein when the allocation unit allocates keywords, the setting unit is recursively called in an allocation process.

In still another embodiment, the extraction unit extracts word sequences over a predetermined length and under a predetermined length as keywords.

In still another embodiment, the allocation unit selects a keyword having the longest word sequence when a plurality of keywords have the same or approximately the same evaluation value.

In still another embodiment, the decision unit determines that the completion conditions are satisfied when the number of piece of data comprising the object document data is under a predetermined value.

In still another embodiment, the decision unit determines that the completion conditions satisfied when the classification included in the object document data becomes the same as the classification to which the document data belongs when a ratio exceeds a predetermined value.

BRIEF DESCRIPTION OF THE DRAWINGS

In the drawings:

FIG. 3 is an explanatory view of sample data;

FIG. 4 is an explanatory view of classification of books;

FIGS. 5 and 6 are one example of process flowcharts executed in a document classifying function building system according to the present invention;

FIG. 7 shows one example of keywords described by word sequences to explain the present invention;

FIG. 9 shows one example of document data classified by the experiment according to the present invention.

FIG. 1 is a basic structure of a document classifying system according to the present invention. In FIG. 1, reference number 1 denotes a document data classifying system. When document data is input into the classifying system, the document data classifying system 1 defines a classification to which the input document data belongs. Reference number 2 denotes a document classifying function building system connected to the document data classifying system 1 for automatically building a classification decision tree in the document data classifying system 1. Reference number 3 denotes a sample data storage apparatus for storing sample data formed by sets of the document data and the classification to which the document data belongs. Reference number 4 denotes a keyword storage apparatus for storing keywords extracted by the document classifying function building system 2.

Figure 1:
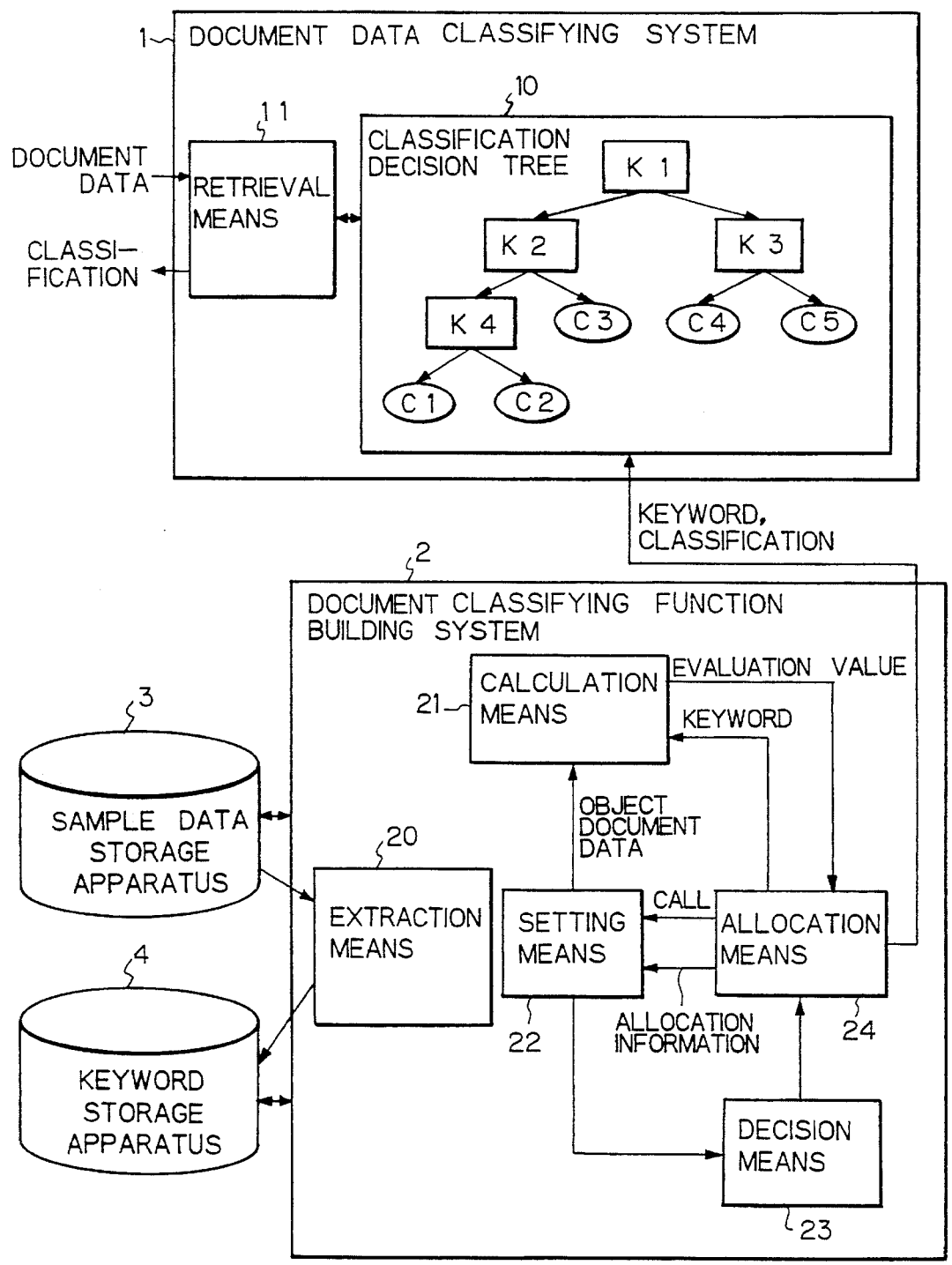
FIG. 1 is a basic structural view of a document classifying system consisting of a document data classifying system and a document classifying function building system.

The document data classifying system 1 is formed by the classification decision tree 10 and a retrieval means 11. The classification decision tree 10 has a plurality of keywords K1 to K4 and classifications C1 to C5. As shown in the drawing, two types of nodes are provided in the classification decision tree 10. For example, as one type of node, the node of the keyword K2 (below, node K2) is branched to the node K4 and the classification C3, and as the other type of node, the node K3 is branched to the classifications C4 and C5. That is, leaf nodes of the node K2 are allocated by the keyword K4 and the classification C3, and leaf nodes of the node K3 are allocated by only classifications C4 and C5.

The retrieval means 11 of the document data classifying system 1 extracts keywords when the document data is input, searches the classification decision tree 10, and outputs the classification as the result of the search.

The document classifying function building system 2 is formed by an extraction means 20, a calculation means 21, a setting means 22, a decision means 23, and an allocation means 24. The extraction means 20 sequentially extracts keywords each defined by the word sequence which is formed by a plurality of sequential words, and stores keywords into the keyword storage apparatus 4. For example, when the document data is expressed as "system's design, research and development", the extraction means 20 extracts "system's design", "system's design, research", "system's design, research and" and "system's design, research and development" as keywords comprising two or more words.

As explained above, since keywords extracted by the extraction means 20 are defined by connection of the word sequence, it is possible to extract keywords without preparation of a dictionary. In this case, since word sequences that are too short or too long are not suitable as a keyword, preferably, a predetermined length (i.e., range) is given to the word sequence, and only word sequences, which are contained in the predetermined range are extracted by the extraction means 20.

The calculation means 21 calculates an evaluation value, which the designated keyword has, in accordance with an evaluation function. The evaluation value is defined by two kinds of attribute values, that is, one attribute value belonging to the document data including the keyword designated in the object document data, and the other attribute value belonging to the document data not including the keyword.

The setting means 22 determines the object document data to be processed by the calculation means 21.

The decision means 23 determines whether or not an allocation process of the keyword should be continued when the setting means 22 determines the object document data. For example, when the amount of data of the object document data is under the predetermined value, or when the classification included in the document data and which is the same as the classification to which the document belongs, is over a predetermined ratio, it is determined that the allocation process has reached the leaf node and this allocation process is completed.

The allocation means 24 allocates the keyword and classification to nodes of the document data classifying system 1. In this allocation process, when there are a plurality of keywords to be designated as candidates for allocation, the keyword having the longest word sequence may be selected.

In the present invention, first, the setting means 22 determines the document data in the sample data storage apparatus 3 as the object document data, informs this object document data to the calculation means 21, and sends a call to the decision means 23. When the decision means 23 receives the call, the decision means 23 determines continuation of the allocation of the keyword and instructs the allocation process of the keyword to the allocation means 24. When the allocation means 24 receives this instruction, the allocation means 24 sequentially designates keywords at the keyword storage apparatus 4, and calls the calculation means 21 to obtain the evaluation value of each keyword. For example, the keyword indicating the smallest evaluation value is selected, and such a keyword is allocated to a root node of the classification decision tree 10.

Next, the setting means 22, as the first step, determines the document data in the sample data storage apparatus 3 (this document data includes the keyword allocated to the root node) as the object document data, informs the object document data to calculation means 21, and calls the decision means 23. When the decision means 23 receives the call, the decision means 23 instructs the allocation of the keyword to the allocation means 24 when the decision means 23 determines continuation of the allocation process. When the allocation means 24 receives this instruction, the allocation means 24 sequentially designates keywords which are not allocated in the keyword storage apparatus 4, and sends them to the calculation means 21. The calculation means 21 calculates the evaluation values included in non-allocated keywords, selects the keyword having the smallest evaluation value, and allocates that keyword to the lower next node in the classification decision tree 10.

Further, the setting means 22, as the second step, determines the document data at the sample data storage apparatus 3 (this document does not includes the keyword allocated to the root node) as the object document data, informs the object document data to calculation means 21, and sends a call to the decision means 23. When the decision means 23 receives the call, the decision means 23 instructs the allocation process of the keyword to the allocation means 24 when the decision means 23 determines the allocation process is to be continued. When the allocation means 24 receives this instruction, this means 24 sequentially designates keywords which are not allocated in the keyword storage apparatus 4, and sends them to the calculation means 21. The calculation means 21 calculates the evaluation values included in non-allocated keywords, selects the keyword having the smallest evaluation value, and allocates that a keyword to the lower next node in the classification decision tree 10.

Similarly, the setting means 22, as the first step, determines the document data in the sample data storage apparatus 3 (this document data is separated until it reaches an upper node, and includes the keyword allocated to the upper node) as the object document data, informs the object document data to calculation means 21, and sends a call to the decision means 23.

When the decision means 23 receives the call, the decision means 23 instructs the allocation means 24 to carry out the allocation process of the keyword when the decision means 23 determines continuation of the allocation process. When the allocation means 24 receives this instruction, this means 24 sequentially designates keywords which are not allocated in the keyword storage apparatus 4, and sends them to the calculation means 21. The calculation means 21 calculates the evaluation values included in non-allocated keywords, selects the keyword having the smallest evaluation value, and allocates that a keyword to the next lower node in the classification decision tree 10.

Further, the setting means 22, as the second step, determines the document data of the sample data storage apparatus 3 (this document data is separated until it reaches the upper node, and does not include the keyword allocated to the upper node) as the object document data, informs the object document data to calculation means 21, and sends the call to the decision means 23.

When the decision means 23 receives the call, the decision means 23 instructs the allocation means 24 to carry out the allocation process of the keyword when the decision means 23 determines continuation of the allocation process. When the allocation means 24 receives this instruction, this means 24 sequentially designates keywords which are not allocated in the keyword storage apparatus 4, and sends them to the calculation means 21. The calculation means 21 calculates the evaluation values included in non-allocated keywords, selects the keyword having the smallest evaluation value, and allocates that keyword to the next lower node in the classification decision tree 10.

As explained above, the setting means 22 is recursively called after allocation of the keyword by the allocation means 24 when the decision means 23 does not determine the completion of the allocation, and determines the new object document data. As a result, the allocation process for keywords is continued.

Further, regarding the setting operation of the object document data by the setting means 22, when setting means 22 determines that the allocation process of the keyword should not be continued, the decision means 23 instructs the allocation means 24 to carry out the allocation process of the classification when the search reaches the leaf node. When the allocation means 24 receives this instruction, the allocation means allocates the classification indicated by the document data, which is determined as the object document data, to the leaf node.

Based on the above execution of the document classifying function building system 2, the preferred keywords enabling the classification of the document data are extracted without any manual preparation. Accordingly, the document data classifying system 1 having the classification decision tree 10 is automatically built by using these keywords.

When the classification decision tree 10 is built, the retrieval means 11 of the document data classifying system 1 extracts keywords defined by connection of the word sequence when the object document data is input thereto. Further, the retrieval means 11 searches the classification decision tree 10 and defines the classification to which the document data belongs. Accordingly, the document data classifying system 1 can easily realize the automatic classification of the document data.

Figure 2:
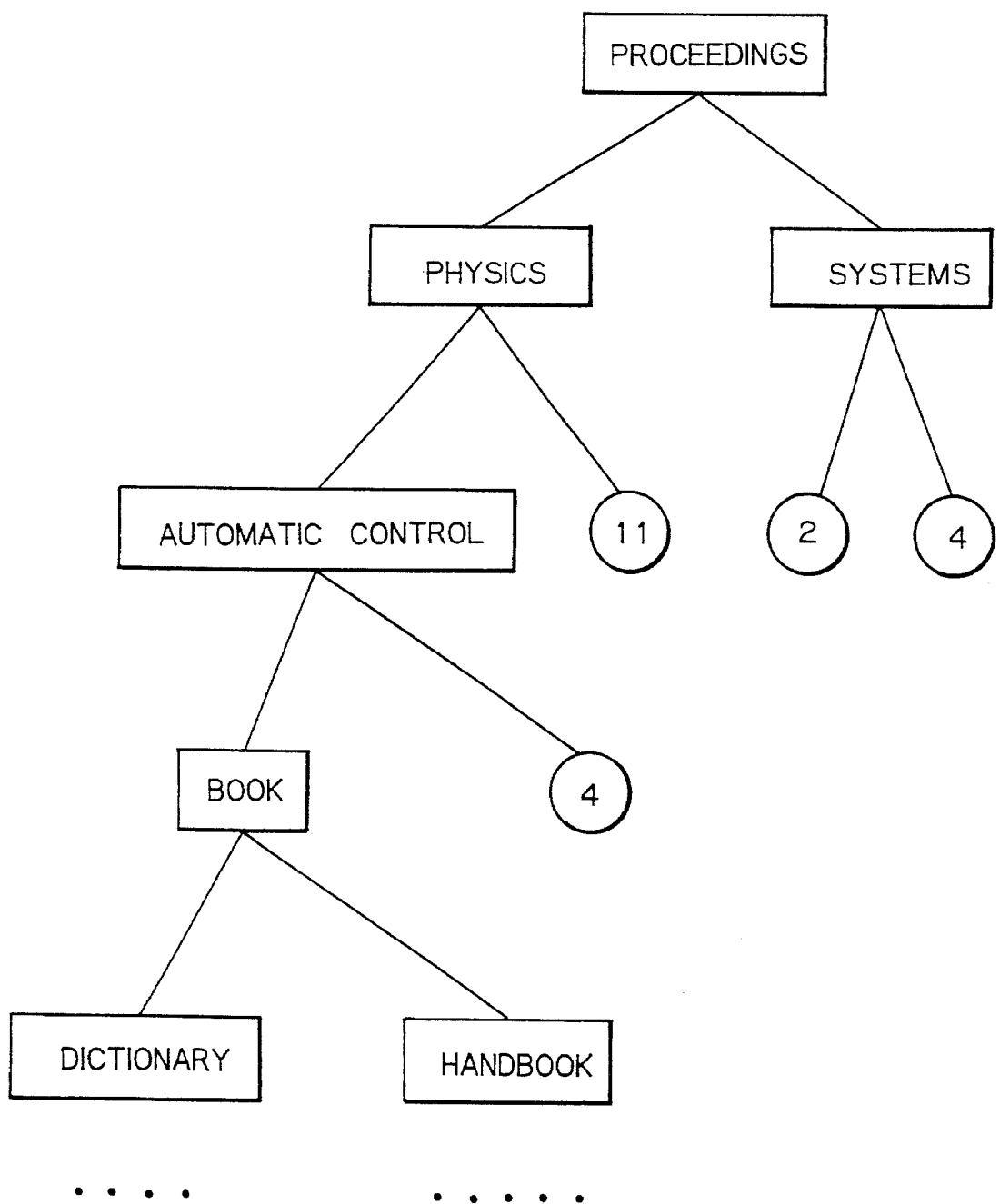
FIG. 2 shows one example of a classification decision tree according to the present invention.

FIG. 2 shows one example of the classification decision tree according to the present invention. This classification decision tree is built by the document classifying function building system 2, and is provided in the document data classifying system 1.

In the classification decision tree 10, as explained above and shown in FIG. 1, a keyword consisting of a sub-word sequence (for example, "system's design" is the sub-word sequence of "system's design, research and development") is labeled at each node, and the classification name of the document data is also labeled at the leaf node. This type of decision tree is called a "two branch tree". In this classification decision tree 10, when a node includes a labeled keyword, the process goes to the lower node of the right side. On the contrary, when the node does not include the labeled keyword, the process goes to the lower of the left side. Accordingly, it is possible to determine a particular path from the root node to the leaf node for one piece of document data so that the classification name of the searched leaf node can represent the classification of the document data.

In the classification decision tree 10 of FIG. 2, for example, the root node allocates the keyword "proceedings", and two nodes of the first layer allocate keywords "physics" and "system". Further, one node of the second layer allocates the keyword "automatic control", one node of the third layer allocates the keyword "book", and two nodes of the fourth layer allocate keywords "dictionary" and "handbook". Further, as shown in the tree, the classifications of "No. 4" and "No. 2" are allocated to leaf nodes of the keyword "system". That is, the leaf node of the right side of the node "system" allocates the classification of "No. 4", and the left side allocates the classification of "No. 2". Further, the classification of "No. 11" is allocated to the right side of the leaf node having the keyword "physics". Still further, the classification of "No. 4" is allocated to the right side of the leaf node having the keyword "automatic control".

In the document data classifying system 1, for example, it is assumed that "Proceedings for Discrete Event System Symposium" is given as the document data. As is obvious, since this document data includes the keyword "proceedings", the process goes to the lower node of the right side including the keyword "system". Further, since the document data includes the keyword "system", the process goes to the classification of "No. 4" of the right side of the leaf node of the node "system". Accordingly, it is easily found that the document data of "Proceedings for Discrete Event System Symposium" belongs to the classification of "No. 4".

The sample data storage apparatus 3 stores the sample data of the document data which are necessary for building the classification decision tree 10.

FIG. 3 shows one example of sample data stored in the sample data storage apparatus 3. In each sample data, the title of a book is given as the document data, and items 00 to 02 denote the classification. As one example, "01" denotes the classification 01, and "ALGEBRA AND GEOMETRY GUIDE" denotes the title of the book. Further, as another example, "02" denotes the classification 02, and "IMAGE AND LANGUAGE ENGINEERING" denotes the title of the book.

FIG. 4 is an explanatory view of the classification of books. In FIG. 4, "00" to "11" denote the classification of the book. For example, the book titled "MEDICAL DICTIONARY" having the classification of "00" in FIG. 3 belongs to the classification name "REFERENCE" having the classification of "00" in FIG. 4. The classification name "REFERENCE" includes "HANDBOOK", "DICTIONARY", etc., as shown in FIG. 4.

FIGS. 5 and 6 are one example of process flowcharts executed in the document classifying function building system according to the present invention. According to these processes, it is possible to automatically build the classification decision tree 10 at the document data classifying system 1.

Before explaining flowcharts, various symbols are explained below. The small character "w" denotes the word sequence of the document data. The small character "l" denotes the classification name of the document data. The large character "S" denotes a set (this "set" denotes a mathematical set) of the document data and the classification, and the initial value of the "S" denotes the sample data stored in the sample data storage apparatus 3. The small character "v" denotes the keyword defined by the sub-word sequence. The symbol "$S_1^v$" is defined as the set including the keyword "v" within the set "S", and defined by the following formula.

$S_1^v = \{(w, l) \in S | \text{"w" includes "v" as sub-word sequence}\}$

The symbol "$S_0^v$" is defined as the set not including the keyword "v" within the set "S", and defined by the following formula.

$S_0^v = \{(w, l) \in S | \text{"w" does not include "v"}\}$

The symbol "Occur (S, c)" is defined as the number of data belongs to the classification of "c" within the set "S" as follows.

occur (S, c) = |{(w, l)|l=c}|

Further, there are "m" classification names expressed by "$l_1, l_2, \ldots, l_m$".

When the set of the document data and the classification is expressed by the symbol "X", the function H(X) (classification entropy) is expressed as follows.

$$u(x) = -\sum_{j=1}^{m} \frac{Occur(X, l_j)}{|X|} \log_2 \frac{Occur(X, l_j)}{|X|}$$

The evaluation function "Loss (v, X)" is expressed by using the function H(X) as follows.

$$\text{Loss}(v, X) = \frac{|X_0^v|}{|X|} H(X_0^v) + \frac{|X_1^v|}{|X|} H(X_1^v)$$

Where, "|X|" is defined as the number of elements of the set "X" and where Loss (U,X) is the information loss of the classification system incurred by selecting the key word v as a classification node in the set "X".

Next, the automatic building of the classification decision tree 10 in the document data classifying system 1 is explained in detail in accordance with a learning algorithm "LEARN" as shown in FIGS. 5 and 6.

In FIG. 5, prior to the building process of the classification decision tree 10, the setting means 22 in the document classifying function building system 2 performs an input process (Input) of the sample data by interacting with the user (step 1), and determines parameters "key 11" and "key 12" which become the extraction conditions of the keywords, and also determines parameters "prnrt" and "nsrt" which become the completion conditions of the learning process (step 2).

Further, in accordance with the "Procedure" which becomes the source of the call, as shown in FIG. 3, the extraction means 20 extracts a sub-word sequence having a length over the parameter "key 11" and having a length under the parameter "key 12" as the candidate "Keywords" of the keyword. A candidate list of keywords shown in FIG. 7 is created in accordance with this extraction process. As explained above, since the document classifying function building system 2 determines all sub-word sequences having a designated length as candidate keywords, it is not necessary to execute the "separated description" which is utilized in Japanese language processing. Accordingly, it is not necessary to provide the conventional dictionary and parser.

When the sample data S, the candidate list of the keyword "Keywords" and the parameters "prnrt" and "nsrt" are provided, as shown in step (4) of the "Procedure", the parameters "prnrt" and "nsrt" are provided as an argument, and a sub-procedure "FINDS" is called to determine the classification decision tree "T" as shown in step (5).

FIG. 6 shows the sub-procedure "FINDS". First, in step 3.1, when the sub-procedure "FINDS" is called from the "Procedure", the sample data S is determined as the set of the object document data. Further, the keyword "v" (i.e., informative keyword), which can separate the set of the object document data into two sets "$S_1^v$", $S_0^v$", is defined, and the evaluation function "Loss (v, S)" is calculated for all "informative keywords "v".

In step 3.2, when the informative keywords do not exist, the step "T=bad" returns to the "Procedure" which is the procedure at the source of the call, and all processes are completed.

On the other hand, when informative keywords exist, in step 3.3, the keyword "$v_g$" which indicates the smallest value of the function value of the evaluation function "Loss (v, S)" is selected within the keywords "v". When the evaluation values are the same, or are approximately the same, the keyword "$v_g$" having the longest word sequence is selected.

Further, in step 3.4, the keyword "$v_g$" selected in step 3.3 is eliminated from the keyword candidate list of "Keywords", and the set "$S_0^{vg}$" which does not include the keyword "$v_g$" is extracted. Further, the sub-procedure "FINDS" is recursively called to determine classification decision tree "$T_0$" of the lower layer when the arguments are defined by the set "$S_0^{vg}$", the new keyword candidate list "Keywords", and the parameters "prnst" and "nsrt". Further, the set "$S_1^{vg}$" which includes the keyword "$v_g$" is extracted, the sub procedure "FINDS" is recursively called to determine classification decision tree "$T_1$" of the lower layer when the arguments are defined by the set "$S_1^{vg}$", the new keyword candidate list "Keywords", and the parameters "prnst" and "nsrt". Further, the set 37 $S_1^{vg}$ which includes the keyword "$v_g$" is extracted.

In step 3.5, the keyword "$v_g$" is determined as the branched source node, and the classification decision tree consisting of the separation tree "$T_0$" branched to the left side and the separation tree "$T_0$" branched to the right side are returned to the "Procedure" of the source of the call.

When the sub procedure "FINDS" is recursively called, it determines the set "$S_0^{vg}$" which does not include the keyword "$v_g$" as the set of the new object document data, and these procedures are repeated. Further, the sub procedure "FINDS" determines the set of "$S_1^{vg}$" which includes the keyword "$v_g$" is the set of the new object document data, and these procedures are repeated.

As explained above, the sub procedure "FINDS" determines the set "$S_0^{vg}$", which is the set of the document data/classification separated until it reaches the upper node and which does not include the keyword "$v_g$" allocated to the upper node, as the set of the new object document data, and the above processes are repeated. Further, the sub procedure "FINDS" determines the set "$S_1^{vg}$" which is the set of the document data/classification separated until it reaches the upper node and which does not include the keyword "$v_g$" allocated to the upper node, as the set of the new object document data, and the above processes are repeated. As a result, the classification decision tree is provided and returned to the "Procedure" of the source of the call.

When executing these processes, the sub-procedure "FINDS", as shown by the flowchart (6) in FIG. 6, defines the classification "$l_i$" of the maximum data number within the classification having the set "S" of the object document data, and calculates a ratio of the number of data between the set "S" of the object document data and the set "S" of the object document data which does not belong to the classification "$l_1$". Further, when the ratio becomes the value smaller than the parameter "nsrt", the process for the lower layer of the classification decision tree is completed and the process is returned to the procedure "T=$l_i$" of the source of the call.

Further, as shown by step (7), the sub-procedure "FINDS" defines the number of data of the set "S" of the object document data. When the number of data defined above becomes the value smaller than the parameter "prnrt", the process for the lower layer of the classification decision tree is completed and the sub procedure "FINDS" defines the classification "$l_i$" of the maximum data number within the classification having the set "S" of the object document data. Further, the process is returned to the procedure "T=$l_i$" of the source of the call.

When the sub-procedure "FINDS" completes all processes, the "Procedure", as shown by the flowchart (5) of FIG. 5, outputs the classification decision tree "T" which is informed by the sub-procedure "FINDS", and completes all processes.

As explained above, the document classifying function building system 2 executes the processes shown in the flowcharts of FIGS. 5 and 6, so that it is possible to automatically build the classification decision tree 10 forming the document data classifying system 2.

When the classification decision tree 10 is built, in the document data classifying system 1, the keywords defined by the connection of the word sequence are extracted from the document data when the document data to be classified is applied to the document data classifying system 1. By searching the classification decision tree 10, the classification to which the document data belongs is defined and the classification process can be executed.

Next, resultant data of an experiment will be explained below to ensure effectivity of the present invention.

This is formed by two experiments 1 and 2. In the first experiment, as shown in FIG. 3, each of sixteen book titles is used as the document data, by using the sample data in which the classification item of the book is defined as the classification, and a checking operation is performed to determine whether or not a suitable classification decision tree 10 is generated.

In the second experiment, first, each of 446 titles is used as the document data, the classification decision tree 10 is generated by using the sample data of the same classification as the classification of each book. Further, in accordance with the classification decision tree 10, the checking operation is performed to determine whether or not the title of each of 306 books, which are not included in the sample data, has been classified to the correct classification.

Figure 8:
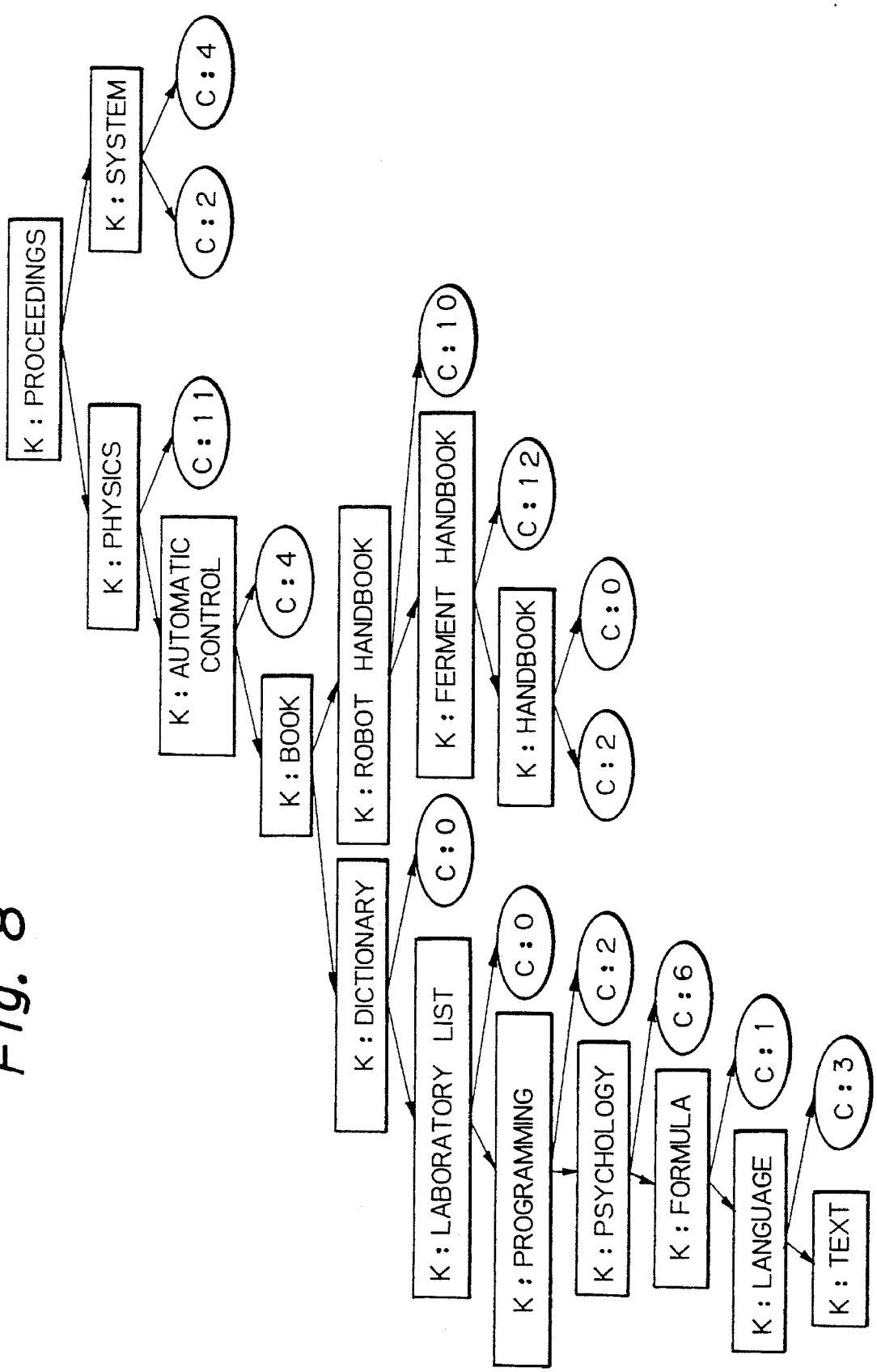
FIG. 8 is an explanatory view of a classification decision tree generated by an experiment according to the present invention.

FIG. 8 shows a part of the classification decision tree generated by the first experiment. Further, FIG. 9 shows the titles of books classified by the classification "04". In the first experiment, the sub-word sequences of more than three words and less than twelve words are extracted as keywords, and the value of the parameter "prnrt" is set to "5", and the value of the parameter "nsrt" is set to "0.2".

As shown in FIG. 8, it is ensured that suitable keywords are extracted so that a suitable classification decision tree 10 is generated in the document classifying function building system 2 according to the present invention.

As shown in FIG. 9, it is clear that two titles of "PROCEEDINGS FOR LARGE SCALE PATTERN INFORMATION" which belongs to the classification "02" and "PROCEEDING FOR ROBOTICS SYSTEM SYMPOSIUM" which belongs to the classification "10" are sorted to the classification "04". However, these two titles should be sorted to the classification "04" because of the contents. If these errors are are contained in the sample data as noise, it is possible to generate a suitable classification decision tree 10 in accordance with the completion conditions of the leaf node used in the present invention.

In the second experiment, the sub-word sequences having of more than three words and less than eight words are extracted as the keywords, the value of the parameter "prnrt" is set to "3", and the value of the parameter "nsrt" is set to "0.05" to generate the classification decision tree 10. In accordance with the generated classification decision tree 10, it is ensured that the titles of the 300 books which are not included in the sample data can be sorted under a correct ratio of 72%.

However, a correct ratio of 72% is not sufficient, because the number of sample data which are used for building the classification decision tree 10 is limited and divided among various fields. If the above problems are clarified, it is possible to improve the correct ratio to a higher percentage.

The present invention is not limited to the above embodiments. For example, although the document data is defined by the titles of books in this embodiment, it is not limited to book titles. Further, although the keywords are selected by using the evaluation function "Loss (v, S)" in this embodiment, it is possible to use another evaluation function.

According to the present invention, it is possible to easily extract suitable keywords enabling the classification of the document data so that it is possible to easily build the document data classifying system having the classification decision tree for realizing automatic classifying the document data.

We claim:

1. A document classifying system comprising:

a document data classifying system for inputting document data and defining a classification to which the document data belongs;

a document classifying function building system operatively connected to the document data classifying system for automatically and recursively building a classification decision tree in the document data classifying system by optimization of a function determined by selection of keywords in the tree;

a sample data storage apparatus operatively connected to the document classifying function building system for storing sample data formed by a set comprised of the document data and the classification to which the document data belongs; and a keyword storage apparatus operatively connected to the document classifying function building system for storing keywords extracted thereby.

2. A document classifying system comprising:

a document data classifying system for inputting document data and defining a classification to which the document data belongs;

a document classifying function building system operatively connected to the document data classifying system for automatically and recursively building a classification decision tree in the document data classifying system;

a sample data storage apparatus operatively connected to the document classifying function building system for storing sample data formed by a set comprised of the document data and the classification to which the document data belongs; and a keyword storage apparatus operatively connected to the document classifying function building system for storing keywords extracted thereby, wherein said document classifying function building system comprises:

extraction means operatively connected to the sample data storage apparatus and the keyword storage apparatus for referencing the sample data consisting of the set of the document data and the classification to which the document data belongs and extracting keywords defined by a connection of a word sequence from the sample data, calculation means for calculating an evaluation value assigned to a designated keyword by the calculation of the Loss function obtained by one attribute value for the document data including the designated keyword within an object document data and another attribute value for the document data not including the designated keyword within the object document data, setting means, operatively connected to the calculation means, for determining the document data for each node such that it assigns the sample data to a root node, and, except for the root node, assigns the document data separated until it reaches an upper node and is classified by keywords allocated by the upper node, decision means operatively connected to the setting means for determining whether or not the attribute included in the object document data is sufficient to satisfy predetermined completion conditions when the setting means determines the object document data, and allocation means operatively connected to the calculation means, the setting means and the decision means, and for, on the one hand, sequentially designating non-allocated keywords and calling the calculation means when the decision means does not determine that the completion conditions are satisfied, obtaining the evaluation value determined from said calculation means for each non-allocated keyword, allocating one of the non-allocated keywords to the node in accordance with the evaluation value; and, on the other hand, when the decision means determines that the completion conditions are satisfied, allocating the classification indicated by the object document data to the node instead of keywords, wherein when the allocation means allocates keywords, the setting means is recursively called in an allocation process.

3. A document classifying system as claimed in claim 2, wherein said extraction means extracts word sequences over a predetermined length and under a predetermined length as keywords.

4. A document classifying system as claimed in claim 2, wherein said allocation means selects a keyword having the longest word sequence when a plurality of keywords have the same or approximately the same evaluation value.

5. A document classifying system as claimed in claim 2, wherein said decision means determines that the completion conditions are satisfied when the amount of the object document data is under a predetermined value.

6. A document classifying system as claimed in claim 2, wherein said decision means determines that the completion conditions are satisfied when the classification included in the object document data becomes the same as the classification to which the document data belongs when a ratio of correctly classified document data to total document data exceeds a predetermined value.

* * * * *

UNITED STATES PATENT AND TRADEMARK OFFICE
CERTIFICATE OF CORRECTION

PATENT NO. : 5,463,773
DATED : Oct. 31, 1995
INVENTOR(S) : SAKAKIBARA et al.

It is certified that error appears in the above-indentified patent and that said Letters Patent is hereby corrected as shown below:

Col. 8, line 63, in the equation, change "u(x) =" to --H(X) =--.

Col. 10, line 6, delete "37";
line 11, change ""$T_0$"" to --"$T_1$"--.

Signed and Sealed this

Sixth Day of February, 1996

Attest:

BRUCE LEHMAN

Attesting Officer

Commissioner of Patents and Trademarks